United States Patent [19]

Shibata et al.

[11] Patent Number: 4,963,794
[45] Date of Patent: Oct. 16, 1990

[54] VEHICLE CORNERING HEADLAMP SYSTEM

[75] Inventors: Hiromi Shibata; Kazuki Takahashi; Keiichi Tajima; Takashi Kurita; Kiyoshi Wada; Kiyoshi Yamashita, all of Shizuoka, Japan

[73] Assignee: Koito Manufacturing Co., Ltd., Tokyo, Japan

[21] Appl. No.: 241,721

[22] Filed: Sep. 8, 1988

[30] Foreign Application Priority Data

Sep. 8, 1987 [JP] Japan ................... 62-223068

[51] Int. Cl.$^5$ .................................... B60Q 1/12
[52] U.S. Cl. .......................... 315/81; 362/43; 362/44; 362/40
[58] Field of Search ............... 315/81; 362/43, 44, 362/40

[56] References Cited

U.S. PATENT DOCUMENTS

| 1,772,799 | 8/1930 | Dietrich | 362/44 |
| 4,276,581 | 6/1981 | Orii et al. | 362/40 |
| 4,663,696 | 5/1987 | Miyazawa et al. | 362/80 |
| 4,733,333 | 3/1988 | Shibata et al. | 362/40 |

FOREIGN PATENT DOCUMENTS

| 77249 | 4/1962 | Japan . |
| 77250 | 4/1962 | Japan . |
| 181938 | 8/1962 | Japan . |
| 244736 | 10/1962 | Japan . |
| 265044 | 4/1983 | Japan . |
| 265045 | 4/1983 | Japan . |

Primary Examiner—Eugene R. Laroche
Assistant Examiner—Do Hyun Yoo
Attorney, Agent, or Firm—Sughrue, Mion, Zinn, Macpeak & Seas

[57] ABSTRACT

A vehicle cornering headlamp system in which the direction of illumination of the headlamps of an automobile are made to follow the actual direction of movement of the vehicle, except that the direction of illumination is returned to the straight-ahead direction more quickly than it is moved away therefrom, thereby more accurately following the usual eye movement of the driver. For this purpose, a control signal is generated which has a pulse width indicative of the steering angle but which has a variation characteristic with respect to steering angle which is larger when the steering wheel is turned back towards the straight-ahead position than when the steering wheel is turned away from the straight-ahead position.

13 Claims, 6 Drawing Sheets

VEHICLE CORNERING HEADLAMP SYSTEM

BACKGROUND OF THE INVENTION

The present invention relates to a vehicle cornering headlamp system in which the direction of illumination of a headlamp is varied in association with a steering wheel turning operation.

A vehicle, especially an automobile, has headlamps for producing a light beam forward of the vehicle at night. The direction of illumination of the headlamps is fixed so that the main beam of light is applied directly forward of the vehicle. However, when the vehicle is traveling along a curve, the headlamps cannot sufficiently illuminate objects ahead of the vehicle. In other words, during travel along curves and in cornering, hazardously objects located in the path of the vehicle may not sufficiently be illuminated by the headlamps.

In order to overcome this difficulty, recently a vehicle cornering headlamp system has been proposed in which the direction of illumination of the headlamps is changed in association with steering wheel turning operations so that objects located in the actual path of the vehicle are sufficiently illuminated.

Figure 11:
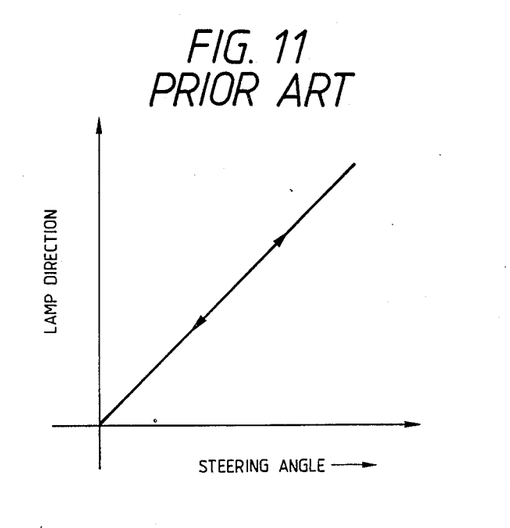
FIG. 11 is a graphical representation showing a variation characteristic of illumination direction with steering angle in a conventional vehicle cornering headlamp system.

However, in the conventional vehicle cornering headlamp system, the variation of direction of illumination varied linearly with respect to the steering angle, that is, the change is the same in the case where the steering wheel is turned away from the straight-ahead steering position as in the case where the steering wheel is returned to the straight-ahead steering position, as shown by the graph in FIG. 11. As a result, the direction of illumination returns to the straight-ahead direction of the vehicle at the same time the steering wheel is returned to the straight-ahead steering position.

In the case where the vehicle travels around a curve, in general, the operator decelerates the vehicle before it reaches the curve, and, after the vehicle reaches the curve, accelerates the vehicle, then returns the steering wheel to the straightahead position before the vehicle reaches the end of the curve. When returning the steering wheel, studies have found that the driver's eyes are no longer on the curved part of the road, but on a linear extension of the curve. Due to the factors, the direction of illumination of the headlamp is not coincident with the direction of the driver's eyes immediately before the vehicle reaches the end of the curve; that is, the driver may feel the change of the direction of illumination of the headlamp inharmonious with the steering-wheel turning operation.

SUMMARY OF THE INVENTION

Accordingly, an object of the invention is to eliminate the above-described difficulties accompanying a conventional vehicle cornering headlamp system.

In a vehicle cornering headlamp system according to the invention, the gradient of a variation characteristic of the illumination direction with respect to the steering angle is made larger in the case where the steering wheel is returned towards the straight-ahead steering position than in the case where the steering wheel is turned away from the straight-ahead steering position.

Accordingly, with the vehicle cornering headlamp system of the invention, the direction of illumination is returned to the straight-ahead direction of the vehicle earlier than the steering wheel.

DESCRIPTION OF THE PREFERRED EMBODIMENTS

A vehicle cornering headlamp system constructed in accordance with the invention will now be described in detail.

Figure 1:
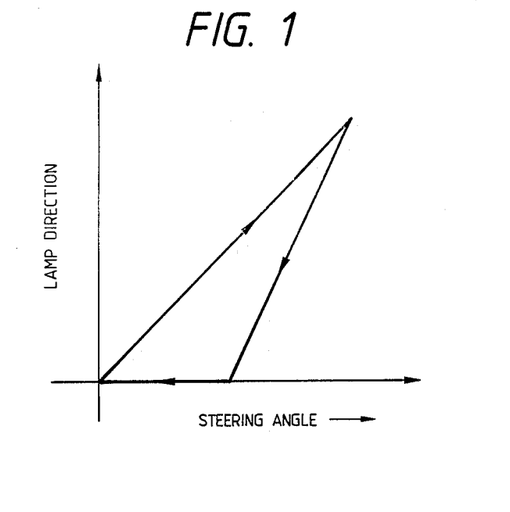
FIG. 1 is a graphical representation showing a variation characteristic of illumination direction with a steering angle, which representation is used for a description of the operating principles of a vehicle cornering headlamp system according the the invention.

FIG. 1 is a graphical representation indicating an illumination direction variation characteristic for a description of the principals of the cornering headlamp system according to the invention. As is apparent from FIG. 1, the variation characteristic of the headlamp angle with steering angle in the case where the steering wheel is turned clockwise (or counterclockwise) away from the straight-ahead (0°) steering position is made different from the variation characteristic in the case where the steering wheel is turned towards the straight-ahead steering position, namely, the latter characteristic has a larger gradient than the former. Therefore, before the steering wheel is returned to the straight forward steering position, the center line of illumination of the headlight is returned to the straight-ahead direction of the vehicle. Accordingly, a variation characteristic of the illumination direction with steering angle corresponding to the movement of the driver's eyes can be obtained by suitably establishing the headlamp swingback characteristic. The inventors have found through experiments that an illumination direction variation characteristic excellent in a sense of human engineering can be obtained by making the inclination of the variation characteristic of headlamp swing angle with steering angle in the case where the steering wheel is returned towards the straight-ahead steering position twice as large as the inclination of the variation characteristic in the case where the steering wheel is turned away from the straight-ahead steering position.

Figure 2:
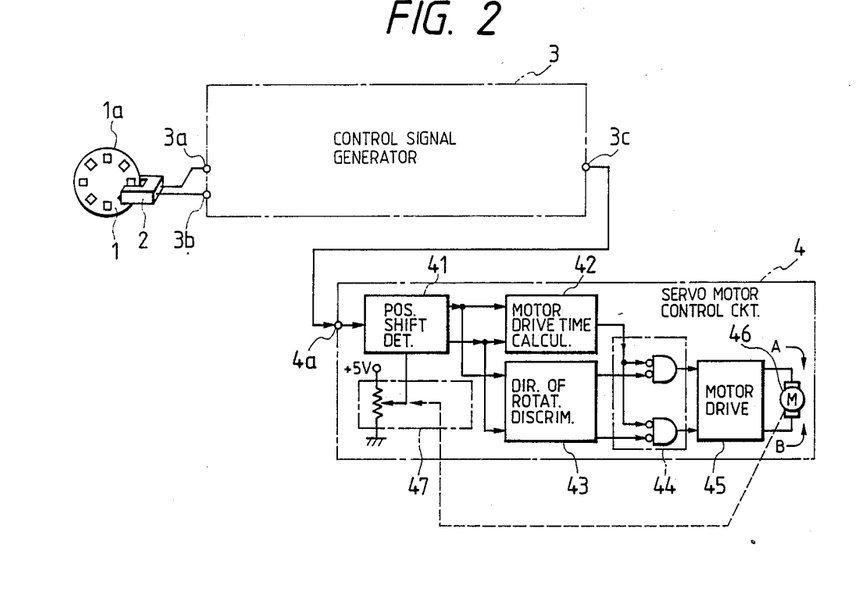
FIG. 2 is an explanatory diagram, partly as a block diagram, showing the arrangement of an example of a vehicle cornering headlamp system of the invention.

An example of a cornering headlamp system of the invention based on the above-described principle is shown in FIG. 2. In FIG. 2, reference numeral 1 designates a rotary disc which is turned in association with the steering wheel, and 2, a photosensor composed of two pairs of light-emitting elements and light-detecting elements (not shown). The rotary disc 1 is turned clockwise (in FIG. 1) when the steering wheel is turned clockwise, and it is turned counterclockwise when the steering wheel is turned counterclockwise. A plurality of slits 1a of like configuration are formed in the peripheral portion of the rotary disc 1 at equal angular intervals. The light-emitting elements and the light-detecting elements of the photosensor 2 are disposed on opposite sides of the rotary disc 1 in such a manner that the light-emitting elements confront the light-detecting elements through the slits 1a. In the photosensor 2, a first photointerrupter, composed of one of the two pairs of light-emitting elements and light-detecting elements, and a second photointerrupter, composed of the other pair, are juxtaposed. As the rotary disc 1 turns clockwise or counterclockwise, the slits 1a pass through the first and second photointerrupters so that electrical pulse signals equal in waveform and shifted by 90° in phase are generated by the first and second photointerrupters. These signals are applied through input terminals 3a and 3b to a control signal generating circuit 3.

Figure 3:
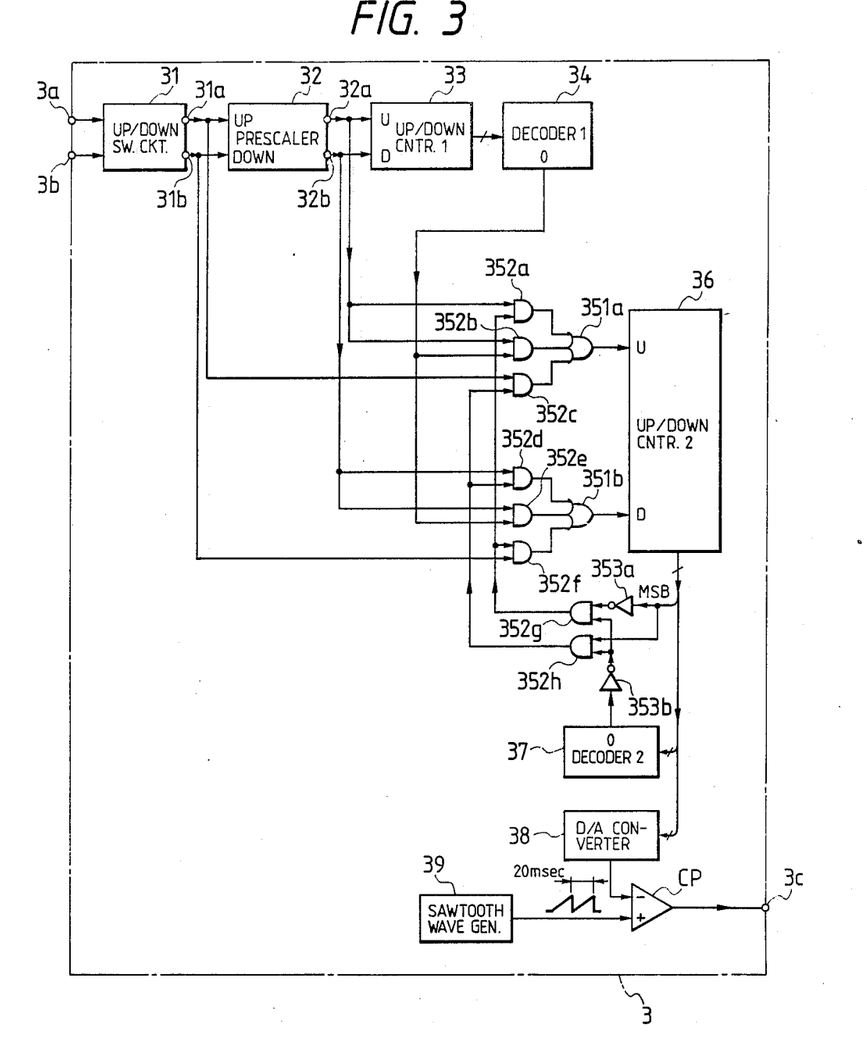
FIG. 3 is a block diagram showing the arrangement of a control signal generating circuit in the vehicle cornering headlamp system shown in FIG. 2.

The control signal generating circuit 3, as shown in FIG. 3, includes: an up/down switching circuit which receives the pulse signals through the input terminals 3a and 3b, detects the direction of rotation of the rotary disc 1, i.e., the direction of turning of the steering wheel, from the phases of the electrical signals thus received, and provides "up" signals or "down" signals, the number of pulses of which corresponds to the amount of turning of the steering wheel counterclockwise or clockwise; a prescaler 32 which receives the "up" signals and the "down" signals through the output terminals 31a and 31b of the up/down switching circuit 31, and provides prescaled "up" and "down" signals through the output terminals 32a and 32b, the period of these signals being twice as large as that of the inputted "up" signals and "down" signals; a first up/down counter 33 which receives the "up" signals and the "down" signals from the prescaler 32 and increase or decrease the count value in accordance with the number of "up" signal or "down" signal pulses; a first decoder 34 which receives the count value of the up/down counter 33 and provides an "H" level output only when the . count value is zero; a second up/down counter 36 which receives the outputs of three-input OR gates 351a and 351b as an "up" input and a "down" input, respectively; a second decoder 37 which receives the count value of the second up/down counter 36 and provides an "H" level output only when the count value is zero; a D/A (digital-to-analog) converter 38 which receives the count value of the second up/down counter 36 and applies a voltage corresponding to the count value thus received to the inverting input terminal (−) of a comparator CP; and a sawtooth wave generator 39 for applying a sawtooth wave reference voltage having a period of 20 msec to the noninverting input terminal (+) of the comparator CP. The count values of the up/down counters 33 and 36 are zero (reference value) when the steering wheel is at the straight-ahead steering position.

The "up" signals and the "down" signals outputted by the prescaler 32 are further applied to AND gates 352a and 352b and AND gates 352d and 352e, respectively. The "up" signals and the "down" signals provided by the up/down switching circuit 31 are further applied to AND gates 352c and 352f, respectively. The output of the decoder 34 is applied to the remaining-input terminals of the AND gates 352b and 352e. The outputs of the AND gates 352a through 352c are applied to the three-input OR gate 351a, and the outputs of the AND gates 352d through 352f are applied to the three-input OR gate 351b. The MSB (most significant bit) of the count value of the up/down counter 36 is applied through an invertor 353a to an AND gate 352g and directly to an AND gate 352h. That is, when the count value of the up/down counter 36 is higher than zero, an "L" level signal is applied, as the MSB, to the invertor 353a and the AND gate 352h, and when the count value is lower than zero, an "H" level signal is applied, as the MSB, to the invertor 353a and the AND gate 352h. The output of the decoder 37 is applied through an invertor 353b to the remaining input terminals of the AND gates 352g and 352h. The output of the AND gate 352g is applied to the AND gates 352a and 352f, and the output of the AND gate 352h is applied to the AND gates 352c and 352d.

In the control signal generating circuit 3 thus constructed, the voltage provided at the inverting input terminal of the comparator CP by the D/A converter 38 is at the middle of the vertical width of the sawtooth wave reference voltage provided at the noninverting input terminal of the comparator CP by the sawtooth wave generator 39. Therefore, the control signal outputted by the comparator CP is a periodic pulse signal having a duty ratio of 50%. As the count value of the up/down counter 36 is increased (or decreased), the voltage provided at the inverting input terminal of the comparator CP is increased (or decreased) according to the count value thus increased (or decreased). Accordingly, when the steering wheel is turned clockwise (or counterclockwise) away from the straight-ahead steering position, the duty ratio of the control signal outputted by the comparator CP is increased (or decreased) from 50%. That is, the pulse width of the control signal periodically outputted by the comparator CP changes with the steering angle: it is increased when the steering wheel is turned clockwise, and it is decreased when the steering wheel is turned counterclockwise. The control signal provided at the output terminal 3c of the control signal generating circuit 3 is applied to a servo motor control circuit 4 through its input terminal 4a.

The servo motor control circuit 4, as shown in FIG. 2, includes a position shift detecting circuit 41 which receives the control signal on an input terminal 4a; a motor drive time calculating circuit 42 and a direction-of-rotation discriminating circuit 43 which receive the outputs of the position shift detecting circuit 41; and AND gate circuit 44 which receives the outputs of the motor drive time calculating circuit 42 and the direction-of-rotation discriminating circuit 43; a motor driver 45 for driving an electric motor 46 according to the output of the AND gate circuit 44; and a potentiometer 47 whose output voltage changes with the angular position of rotation of the electric motor 46.

Figure 4:
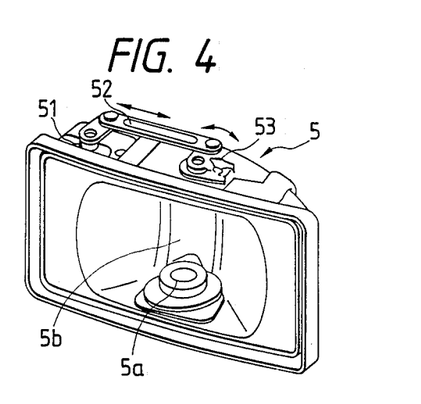
FIG. 4 is an external perspective view of a headlamp the direction of illumination of which is changed with the vehicle cornering headlamp system of the invention.

The direction of illumination of a headlamp (FIG. 4) installed on the vehicle is changed by the torque of the electric motor 46 controlled by the servo motor control circuit 4. This will be described in more detail. When current is applied to the electric motor 46 in the direction of the arrow A in FIG. 2, the output shaft 46a (FIG. 5) of the electric motor 46 is turned clockwise. As a result, the torque of the motor is applied through a crown gear 46b and a worm gear 46c to a sub-reflector 5b rotatably provided behind a headlamp 5a (FIG. 4) to turn the sub-reflector 5b in such a manner that the direction of illumination of the headlamp 5 is shifted to the right as viewed by the operator. When current is applied to the electric motor 46 in the direction of the arrow B (FIG. 2), the torque of the motor is applied through the crown gear 46b and the worm gear 46c to the sub-reflector 5b so that the direction of illumination of the headlamp 5 is shifted to the left as viewed by the operator.

Figure 5:
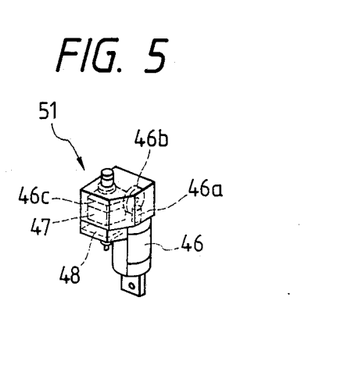
FIG. 5 is an external perspective view of a speed reduction drive mechanism coupled to an electric motor in the vehicle cornering headlamp system.

The crank gear 46b and the worm gear 46c coupled mechanically to the output shaft 46a of the electric motor 46 form a speed reduction drive mechanism 51. The speed reduction drive mechanism 51 is incorporated into the headlamp 5 on the rear side. The torque of the speed reduction drive mechanism 51 is transmitted through a link 52 to the sub-reflector 5b to swing the latter to the right or to the left. When the electric motor 46 is not operated, a "zero" mechanism 53 operates to forcibly return the sub-reflector 5b to the central position of its swing so that the direction of illumination of the headlamp is held directly forward of the vehicle. The speed reduction drive mechanism 51 is coupled to the potentiometer 47. A servo motor control board 48 on which the above-described position shift detecting circuit 41, motor drive time calculating circuit 42, direction-of-rotation discriminating circuit, AND gate circuit 44 and motor driver 45 are constructed is provided below the potentiometer 47, as shown in FIG. 5.

Figure 6:
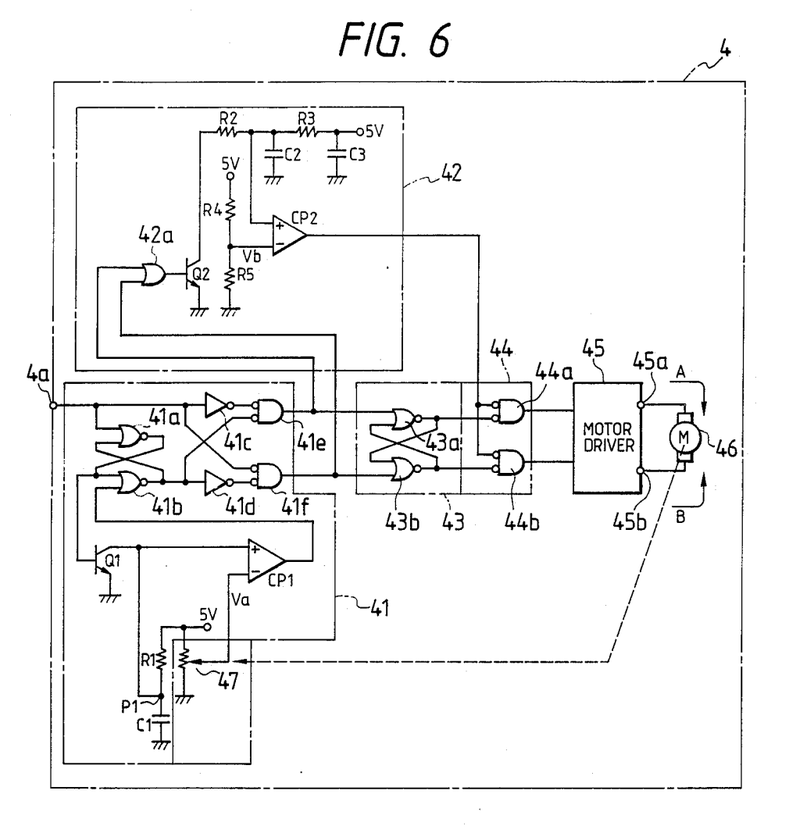
FIG. 6 is a circuit diagram, partly as a block diagram, showing the arrangement of a servo motor control circuit in the vehicle cornering headlamp system shown in FIG. 2.

The arrangements of the position shift detecting circuit 41, the motor drive time calculating circuit 42, and the direction-of-rotation discriminating circuit 43 in the servo motor control circuit 4 are shown in FIG. 6 in more detail. The position shift detecting circuit 41 includes NOR gates 41a and 41b, inverters 41c and 41d, inverting-input AND gates 41e and 41f, an NPN transistor Q1, a comparator CP1, a resistor R1, and a capacitor C1. The potential at the connecting point P1 of the collector of the transistor Q1, the resistor R1, and the capacitor C1 is applied to the noninverting input terminal of the comparator CP1. The motor drive time calculating circuit 42, is composed of an OR gate 42a which receives the outputs of the inverting-input AND gates 41e and 41f in the position shift detecting circuit 41; and NPN transistor Q2 to the base of which the output of the OR gate 42a is applied; a comparator CP2; resistors R2 through R5; and capacitors C2 and C3. In the motor drive time calculating circuit 42, the potential at the connecting point of the capacitor C2 and the resistor R2 which is connected to the collector of the transistor Q2 is applied to the noninverting input terminal (+) of the comparator CP2, and a divided voltage Vb outputted by a voltage divider composed of the resistors R4 and R5 is applied to the inverting input terminal (−) of the comparator CP2. The direction-of-rotation discriminating circuit 43 includes NOR gates 43a and 43b, to first input terminals of which the outputs of the negative logic input AND gates 41e and 41f in the position shift detecting circuit 41 are respectively applied. The outputs of the NOR gates 43a and 43b are applied to first input terminals of inverting-input AND gates 44a and 44b in the AND gate circuit 44, respectively. The output of the comparator CP2 in the motor drive time calculating circuit is applied to the remaining second input terminals of the inverting input AND gates 44a and 44b.

The operation of the cornering headlamp system thus constructed will be described beginning with its fundamental operation.

It is assumed that the steering wheel is at the straight-ahead steering position, and the sub-reflector 5b is at the central position of its swing, so that the center line of the illuminating pattern of the headlamp 5 extends directly forward of the vehicle. In this case, the count value of the up/down counter 36 is zero, and therefore a periodic pulse signal having a duty ratio of 50% is provided, as a control signal to the servo motor control circuit 4, at the output terminal 3c by the control signal generating circuit 3. When, under this condition, the steering wheel is turned clockwise, for instance, the count value of the up/down counter 36 is decreased in accordance with the amount of clockwise rotation of the steering wheel, and the voltage provided at the inverting input terminal of the comparator CP through the D/A converter 38 decreases. On the other hand, pulse signals outputted by the comparator CP, that is, the control signal applied to the servo motor control circuit 4 through the output terminal 3c of the control signal generating circuit 3, increases in duty ratio, and the pulse width of the control signal is increased in accordance with the amount of clockwise rotation of the steering wheel.

Figure 7:
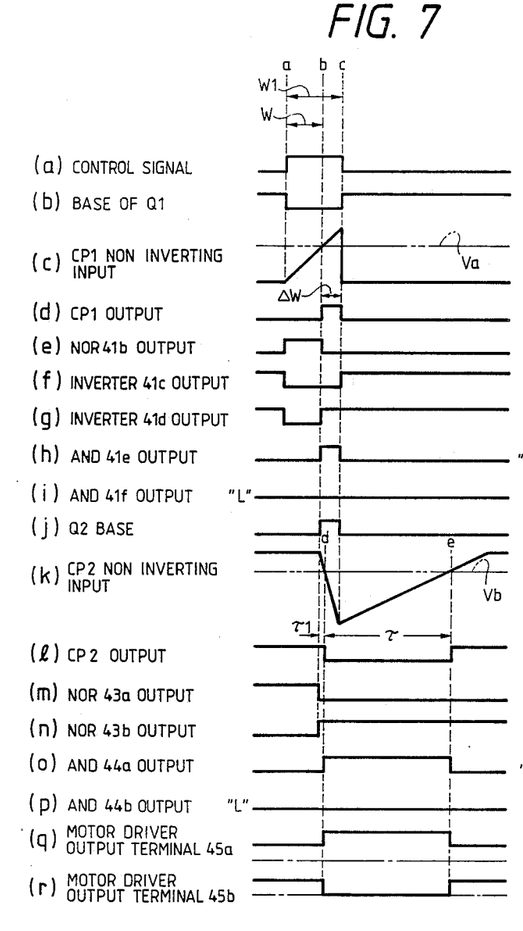
FIG. 7 is a timing chart for a description of a direction-of-illumination changing operation effected when the steering wheel is turned clockwise away from the straight-ahead steering position in the vehicle cornering headlamp system of the invention.

It is assumed that, as the steering wheel is turned clockwise from the straight-ahead steering position, the control signal applied to the servo motor control circuit 4 increases in duty ratio, with the pulse width of the control signal increasing as shown in part (a) of FIG. 7; that is, the pulse width W provided when the steering wheel is at the straight-ahead steering position is increased to W1. The control signal is applied to the position shift detecting circuit 41 in the servo motor control circuit. Upon the rise of the control signal (point a in part (a) of FIG. 7) the base voltage of the transistor Q1 is set to the "L" level (low logic level - the point a in part (b) of FIG. 7), so that the transistor Q1 is rendered nonconductive. As the transistor Q1 is nonconductive, the capacitor C1 is charged through the resistor R1 so that the potential at the connecting point P1 of the capacitor C1 and the resistor R1, i.e., the potential at the noninverting input terminal of the comparator CP1 increases (point a in part (c) of FIG. 7). On the other hand, in this operation, the voltage provided at the inverting input terminal of the comparator CP1 through the potentiometer 47 (Va in part (c) of FIG. 7) has a value corresponding to the present angle of rotation of the electric motor 46 (2.5V in this instance). Therefore, when the potential at the connecting point Pl, which is applied to the noninverting input terminal, exceeds the voltage Va at the inverting input terminal, the output of the comparator CP1 is raised to the "H" level (high logic level-point b in part (d) of FIG. 7).

When the base voltage of the transistor Q1 is raised to the "H" level at the fall of the control signal as indicated in part (a) of FIG. 7 (point c in part (b) of FIG. 7), immediately the potential at the noninverting input terminal becomes substantially equal to ground potential (point c in part (c) of FIG. 7), and therefore the output of the comparator CP1 is set to the "L" level (point c in part (d) of FIG. 7). That is, the output of the comparator CP1 is raised to the "H" level, creating a pulse width $\Delta W$ determined by the difference between the pulse width W1 of the control signal and the pulse width W provided when the steering wheel is at the straight-ahead steering position ($\Delta W = W1 - W$). The output of the comparator CP1, i.e., an "H" level signal having the pulse width $\Delta W$, is provided at the output terminal of the negative logic input AND gate 41e (part (h) of FIG. 7), thus being applied, as an amount of position shift between a target direction of illumination determined according to the steering angle and the actual direction of illumination, to the motor drive time calculating circuit 42 and the direction-of-rotation discriminating circuit 43.

Parts (e), (f), (g) and (i) of FIG. 7 show the outputs of the NOR gate 41b, invertor 41c, invertor 41d, and inverting input AND gate 41f, respectively.

The output of the inverting input AND gate 41e, which is applied to the motor drive time calculating circuit 42, is applied through the OR gate 42a to the base of the transistor Q2 (part (j) of FIG. 7). As a result, the transistor Q2 is rendered conductive for the duration of the pulse width $\Delta W$, and therefore the capacitor C2 is discharged through the resistor R2, and the voltage at the noninverting input terminal of the comparator CP2 decreases (point b in part (k) of FIG. 7). When the voltage at the noninverting input terminal becomes lower than the output voltage (Vb in part (k) of FIG. 7) of the voltage divider composed of the resistors R4 and R5, the output of the comparator CP2 is set to the "L" level (point d in part (1) of FIG. 7). When the transistor Q2 is rendered nonconductive at the point c in part (j) of FIG. 7, the capacitor C2 in charged through the resistor R3, and the voltage at the noninverting input terminal of the comparator CP2 gradually increases. When the voltage at the noninverting input terminal exceeds the divided voltage Vb provided at the inverting input terminal (point e in part (k) of FIG. 7), the output of the comparator CP2 is raised to the "H" level (point e in part (1) of FIG. 7). That is, the output of the comparator CP2 is maintained at the "L" level for a period of time $\tau$ corresponding to the pulse width $\Delta W$ which has been detected as an amount of position shift between a target direction of illumination determined from a steering-wheel steering angle and an actual direction of illumination. This output (position shift calculating signal) of the comparator CP2 is applied to the inverting input AND gate 44a and 44b in the AND gate circuit 44.

In the above-described embodiment, the charge time constant determined by the values of the capacitor C2 and the resistor R3 is large than the discharge time constant determined by the values of the capacitor C2 and the resistor R2. It goes without saying that the period of time $\tau$ (position shift calculating time) corresponding to the pulse width W can be adjusted by changing the charge time constant and the discharge time constant.

Figure 8:
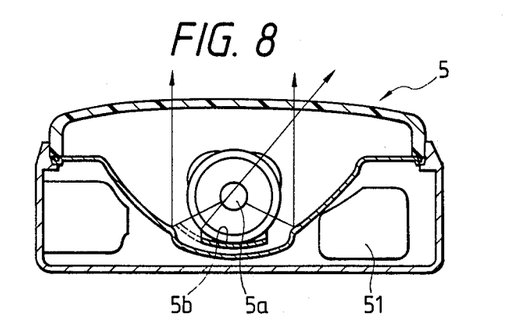
FIG. 8 is a sectional plan view of the headlamp shown in FIG. 4.

In the direction-of-rotation discriminating circuit 43, the outputs of the NOR gates 43a and 43b (parts (m) and (n) of FIG. 7), are changed to the "L" level and "H" level, respectively, at the rise of the position shift detecting signal having the pulse width W provided by the inverting input AND gate 41e in the position shift detecting circuit 41. The position shift calculating signal provided by the comparator CP2 a period time $\tau_1$ after the change is outputted through the inverting input AND gate 44a (part (o) of FIG. 7). In response to the "H" level position shift calculating signal being outputted by the inverting input AND gate 44a, voltages at the output terminals 45a and 45b of the motor driver 45 are changed to the "H" level and "L" level, respectively, from "M" (middle)" level (parts (q) and (r) of FIG. 7), as a result of which drive current is caused to flow through the electric motor 46 in the direction of the arrow A (FIG. 6). Therefore, the output shaft 46a of the electric motor 46 is rotated clockwise to turn the sub-reflector 5b (FIG. 4) so that the center line of the illumination pattern of the headlamp 5 is shifted to the right (the steering wheel turning direction) as viewed by the operator (see FIG. 8).

When the center line of the illumination pattern of the headlamp 5 is shifted to the right in the above-described manner, the voltage Va provided at the inverting input terminal of the comparator CP1 by the potentiometer 47 is increased in accordance with the angle of rotation of the output shaft 46a of the motor 46, the pulse width $\Delta W$ of the next pulse of the position shift detecting signal obtained in response to the next control signal outputted by the control signal generating circuit 3 is decreased, and the position shift calculating time $\tau$ corresponding to the pulse width $\Delta W$ is decreased. These operations are repeatedly carried out. When the pulse width $\Delta W$ of the position shift detecting signal becomes zero, the target direction of illumination coincides accurately with the actual direction of illumination of the headlamp 5.

As the direction of illumination of the headlamp 5 approaches the target direction, the position shift calculating time $\tau$ is decreased, and the drive current supplied to the electric motor 46 is interrupted during the period of the control signal; that is, for every period of the control signal, the drive current is intermittently supplied only for the position shift calculating time $\tau$. However, after interruption of the supply of drive current, the motor 46 keeps rotating due to inertia, and since the period of the control signal is short, the direction of illumination of the headlamp 5 will coincide with the target direction as if the sub-reflector turned linearly. In this operation, as the direction of illumination of the headlamp 5 approaches the target direction, the drive current supplying time is decreased. As a result, overrunning of the motor 46 can be prevented when the actual direction of illumination coincides with the target direction.

In the case where, on the other hand, the steering wheel is turned counterclockwise from the straight-ahead steering position, the count value of the up/down counter 36 is increased, and the voltage at the inverting input terminal of the comparator CP is increased in accordance with the increasing count value of the up/-down counter 36. Therefore, the duty ratio of the control signal applied to the servo motor control circuit 4 is decreased.

Figure 9:
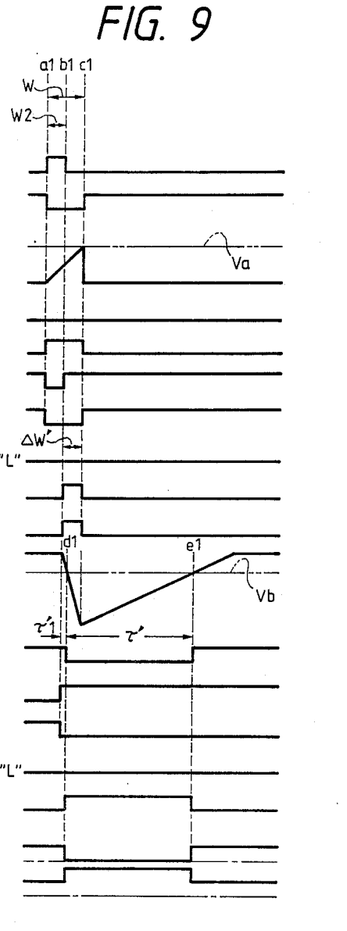
FIG. 9 is a timing chart for a description of a direction-of-illumination changing operation effected when the steering wheel is turned counterclockwise away from the straight-ahead steering position.

It is assumed that, as the steering wheel is turned counterclockwise from the straight-ahead steering position, the duty ratio of the control signal is decreased, and the pulse width of the control signal is decreased, as shown in part (a) of FIG. 9; that is, the pulse width W provided when the steering wheel is at the straight-ahead steering position is decreased to W2. In this case, at the rise of the control signal, the transistor Q1 is rendered nonconductive and the potential at the noninverting input terminal of the comparator CP1 is increased (point al in part (c) of FIG. 9). When the potential at the noninverting input terminal of the comparator CP1 exceeds the voltage Va at the inverting input terminal (point c1 in part (c) of FIG. 9), the output of the comparator CP1 is raised to the "H" level (point c1 in part (d) of FIG. 9) while the base potential of the transistor Q1 is raised the "H" level (point c1 in part (b) of FIG. 9). Therefore, at this time instant, the transistor Q1 is rendered conductive, whereupon the potential at the noninverting input terminal of the comparator CP1 becomes substantially equal to ground potential, and therefore the output of the comparator CP1 is set to the "L" level instantaneously.

On the other hand, the output of the inverting-input AND gate 41f is raised to the "H" level at the fall of the control signal shown in part (a) of FIG. 9 (point b1 in part (i) of FIG. 9), and is set to the "L" level by the "H" level output of the comparator CP1. That is, the output of the inverting input AND gate 41f is raised to the "H" level with a pulse width $\Delta W'$ equal to the difference between the pulse width W provided when the steering wheel is at the straight-ahead steering position and the pulse width W2 provided when the steering wheel is turned counterclockwise ($\Delta W' = W - W2$). The "H" level signal having the pulse width $\Delta W'$ is applied, as an amount of position shift between a target direction of illumination determined according to the actual steering angle and the actual direction of illumination of the headlamp, to the motor drive time calculating circuit 42 and the direction-of-rotation discriminating circuit 43.

Upon reception of the position shift detecting signal having the pulse width $\Delta W'$, the motor drive time calculating circuit 42 generates a pulse of the position shift calculating signal having a width $\tau'$ corresponding to the pulse width $\Delta W'$ (part (1) of FIG. 9). On the other hand, in the direction-of-rotation discriminating circuit 43, the outputs of the NOR gates 43a and 43b (parts (m) and (n) of FIG. 9) are changed to the "H" level and "L" level, respectively, at the rise of the position shift detecting signal. The position shift calculating signal provided a period time $\tau_1'$ after this change is outputted through the inverting input AND gate 44b (part (p) of FIG. 9). According to the "H" level position shift calculating signal outputted by the inverting input AND gate 44b, voltages at the output terminals 45a and 45b of the motor driver 45 are changed to the "L" level and "H" level, respectively, from "M" levels (parts (q) and (r) of FIG. 9), as a result of which drive current is caused to flow in the motor 46 in the direction of the arrow B for the position shift calculating time $\tau'$. Therefore, the output shaft 46a of the motor 46 is rotated counterclockwise to turn the sub-reflector 5b so that the direction of illumination of the headlamp 5 is shifted to the left (the direction in which the steering-wheel is turned) as viewed by the operator.

When the direction of illumination of the headlamp 5 is shifted to the left in the above-described manner the voltage Va provided at the inverting input terminal of the comparator CP1 by the potentiometer 47 is decreased in accordance with the angle of rotation of the output shaft 46a of the motor 46, the pulse width $\Delta W'$ of the next pulse of the position shift detecting signal obtained in response to the next control signal pulse outputted by the control signal generating circuit 3 is decreased, and the position shift calculating time $\tau'$ corresponding to the pulse width $\Delta W'$ is decreased. These operations are repeatedly carried out. When the pulse width $\Delta W'$ of the position shift detecting signal reaches zero, the target direction of illumination will coincide with the actual direction of illumination of the headlamp 5.

In the cornering headlamp system performing the fundamental operation as described above, the difference between a direction-of-illumination changing operation effected in the case where the steering wheel is turned away from the straight-ahead position and a direction-of-illumination changing operation effected in the case where the steering wheel is turned back towards the straight-ahead steering position will be described with reference to the timing chart shown in FIG. 10.

Figure 10:
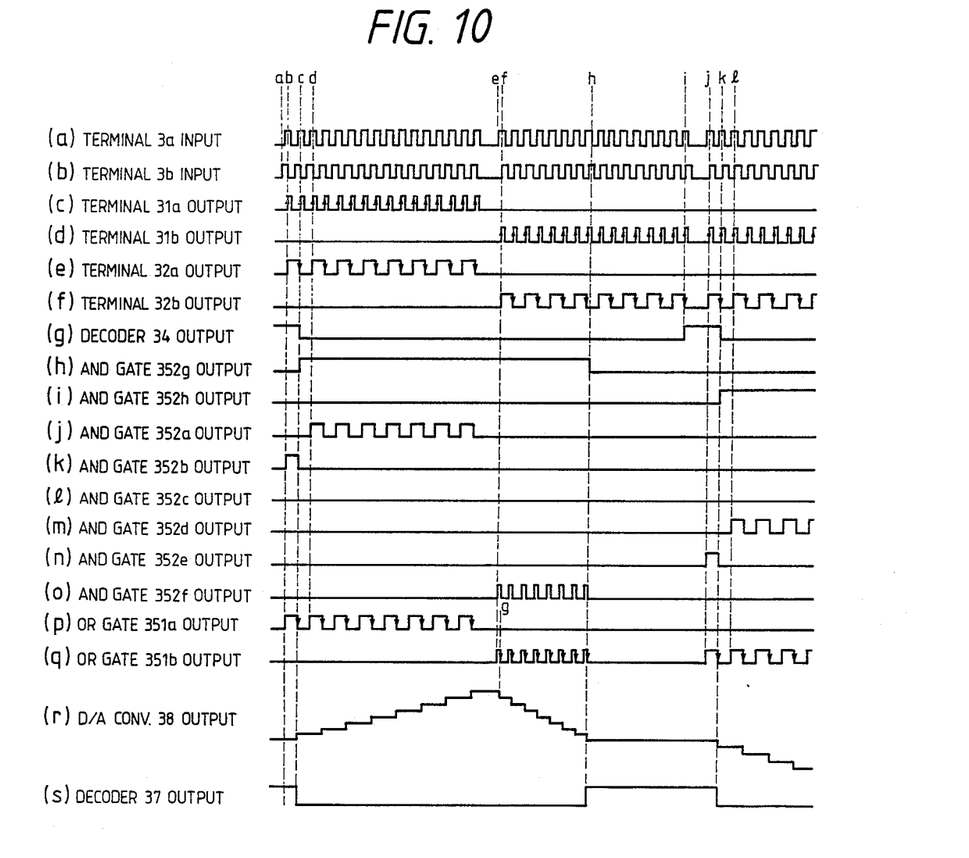
FIG. 10 is also a timing chart for a description of the operation of the control signal generating circuit shown in FIG. 3.

When the steering wheel is turned counterclockwise from the straight-ahead steering position, the rotary disc 1 shown in FIG. 2 is turned counterclockwise, so that electrical pulse signals shifted by about 90° in phase are applied to the up/down switching circuit 31 through the terminals 3a and 3b (the point a in parts (a) and (b) of FIG. 10). The up/down switching circuit 31 detects the clockwise steering operation from the phases of the pulse-shaped electrical signals, and outputs "up" signal pulses, the number of which corresponds to the amount of clockwise rotation of the steering wheel, through its output terminal 31a (point b in part (c) of FIG. 10). The "up" signals pulses outputted by the up/down switching circuit 31 are applied to the prescaler 32, from which they are outputted as "up" signal pulses having twice the period, through the output terminal 32a of the prescaler 32 (point b in part (e) of FIG. 10). The "up" signals produced by the up/down switching circuit 31 are further applied to the AND gate 352c. In this operation, the output of the decoder 37 is at the "H" level (point b in part (s) of FIG. 10), and therefore the output of the AND gate 352h is at the "L" level (point b in part (i) of FIG. 10). Accordingly, the "up" signal pulses produced by the up/down switching circuit 31 cannot pass through the AND gate 352c, that is, they are not applied, as a count-up signal to the up/down counter 36. On the other hand, the "up" signals outputted by the prescaler 32 pass through the AND gate 352b (point b in part (k) of FIG. 10) because the output of the decoder 34 is at the "H" level (point b in part (g) of FIG. 10), so that "up" signal pulses are applied, as a count-up input signal, to the up/down counter 36 through the OR gate 351a (point b in part (p) of FIG. 10).

In the up/down counter 36, the count value is increased from zero in response to the "up" signal pulses applied thereto through the OR gate 351a; that is, the count value is increased by one at the fall of each of the "up" signal pulses (point c in part (p) of FIG. 10). The output voltage of the D/A converter 38 increases with the increasing count value of the up/down counter 36 (point c in part (r) of FIG. 10), and the duty ratio of the control signal outputted by the comparator CP decreases with the increasing output voltage of the D/A converter 38.

On the other hand, the "up" signal pulses provided at the output terminal 32a of the prescaler 32 are further applied, as a count-up input signal, to the up/down counter 33, so that the count value of the latter is increased from zero; that is, the count value is increased by one at the fall of each of the "up" signal pulses. In response to the count value thus increased, the output of the decoder 34 is set to the "L" level (point c in part (g) of FIG. 10), so that the AND gates 352b and 352e are closed. On the other hand, as the count value of the up/down counter 36 increases from zero, the output of the decoder 37 is set to the "L" level (point c is part (s) of FIG. 10), and the MSB (most significant bit) of the count value provided by the up/down counter 36 is set to the "L" level, as a result of which the output of the AND gate 352g is raised to the "H" level (point c in part (h) of FIG. 10), and the AND gates 352a and 352f are opened. In this operation, the output of the AND gate 352h is maintained at the "L" level (point c in part (i) of FIG. 10), and therefore the AND gates 352c and 352d are held open. As a result, thereafter the "up" signal pulses provided at the output terminal 32a (point d in part (j) of FIG. 10). The "up" signal pulses thus passed through the AND gate 352a are applied, as a count-up input signal, to the up/down counter 36 through the OR gate 351a.

In other words, when the steering wheel is turned counterclockwise away from the straight-ahead steering position, "up" signals pulses in a number which corresponds to the, amount of counterclockwise rotation of the steering wheel are supplied through the output terminal 31a of the up/down switching circuit 31, and the count value of the up/down counter 36 is increased at the fall of each of the "up" signal pulses of doubled period which are provided at the output terminal 32a of the prescaler 32 in response to the "up" signal pulses outputted by the up/down switching circuit 31. The output voltage of the D/A converter 38 is increased with the increasing count value of the up/down counter 36, the duty ratio of the control signal provided by the comparator CP is decreased with the increasing output voltage of the D/A converter 38, and with the control signal thus decreased in duty ratio the direction of illumination is changed in correspondence to the steering angle when the steering wheel is turned counterclockwise away from the straight-ahead steering position.

When the steering wheel, after being turned counterclockwise away from the straight-ahead steering position as described above, is turned clockwise back towards the straight-ahead steering position, the phases of the pulse signals inputted through the terminals 3a and 3b are inverted (point e in part (a) and (b) of FIG. 10). The up/down switching circuit 31 detects the clockwise steering operation from the phases of the pulse signals, and outputs "down" signals indicative of the amount of clockwise rotation of the steering wheel through the output terminal 31b (point f in part (d) of FIG. 10). In response to the "down" signals outputted by the up/down switching circuit 31, the prescaler 32 provides "down" signals of doubled-period at the output terminal 32b (point f in part (f) of FIG. 10). In this operation, since the AND gates 352d and 352e are maintained closed, the "down" signals outputted by the prescaler 32 will not be applied as count down input signals to the up/down counter 36.

On the other hand, the "down" signals outputted by the up/down switching circuit 31 are further applied to the AND gate 352f, and in this operation the AND gate 352f is maintained open. Therefore, the "down" signals are passed through the AND gate 352f (point f in part (o) of FIG. 10), and are applied as count-down input signals to the up/down counter 36 through the OR gate 351b (point f in part (q) of FIG. 10). The count value of the up/down counter 36 is decreased at the fall of each of the "down" signal pulses inputted through the OR gate 351b, and the output voltage of the D/A converter 38 is decreased with the decreasing count value of the counter 36 (point g in part (r) of FIG. 10).

In other words, when the steering wheel, after being turned counterclockwise, is turned clockwise towards the straight-ahead steering position, "down" signal pulses in a number indicative of the amount of rotation of the steering wheel are applied to the up/down counter 36 through the output terminal 31b of the up/down switching circuit 31, and thus the count value of the counter 36 is decreased at the fall of each of the "down" signal pulse thus applied. The output voltage of the D/A converter 38 is decreased with the decreasing count value of the counter 36, the duty ratio of the control signal provided by the comparator CP is increased with the decreasing output voltage of the D/A converter 38, and with the control signal thus increased in duty ratio the direction of illumination is changed in correspondence to the steering angle when the steering wheel is turned towards the straight-ahead steering position. In this case, the "down" counting operation of the up/down counter 36 is carried out at half the period of the "down" signals outputted by the prescaler 32. Therefore, in the case where the steering wheel is turned counterclockwise away from the straight-ahead steering position and then turned clockwise back towards the straight steering position, the count value is zeroed when the steering wheel is turned back towards the straight-ahead steering position through half the steering angle through which the steering wheel was turned (point h in part (r) of FIG. 10); that is, the line of illumination of the headlamp is swung back so as to be in the straight-ahead direction of the vehicle earlier than the steering wheel is returned to the straight-ahead steering position.

While the invention has been described with reference to the case where the steering wheel is turned counterclockwise from the straight-ahead steering position and then turned clockwise towards the straight-ahead steering position, it goes without saying that the above description is equally applicable to the case where the steering wheel, after being turned clockwise from the straight-ahead steering position, is turned counterclockwise towards the straight-ahead steering position. Similarly, in the case where the steering wheel is turned clockwise or counterclockwise from a position other than the straight-ahead steering position, the inclination of the illumination direction variation characteristic can be made larger in the case where the steering wheel is turned back towards the straight-ahead steering position than in the case where the steering wheel is turned away from the straight-ahead steering position.

As described above, in the vehicle cornering headlamp system of the invention, the inclination of the variation characteristic of the direction of illumination with respect to the steering angle is made larger in the case where the steering wheel is turned back towards the straight-ahead steering position than in the case where the steering wheel is turned away from the straight-ahead steering position, and therefore the center line of the illumination pattern of the headlamp is swung back so as to be in the straight-ahead direction of the vehicle earlier than the steering wheel is returned to the straight-ahead steering position. Accordingly, an illumination direction variation characteristic which corresponds to the movement of the driver's eyes and is excellent in a sense of human engineering is obtained.

What is claimed is:

1. In a vehicle cornering headlamp system of the type in which the direction of illumination of headlamp means is changed in association with a steering wheel turning operation, the improvement comprising: characteristic varying means for making a gradient of a variation characteristic of said direction of illumination with respect to a steering angle larger in a case where a steering wheel is turned towards a straight-ahead steering position than in a case where said steering wheel is turned away from said straight-ahead steering position.

2. A vehicle cornering headlamp system in which the direction of illuminating lamp means is changed in association with a steering wheel turning operation, comprising:

servo motor means for setting said direction of said illuminating lamp means in response to a controls signal;

means for producing said control signal in response to turning of said steering wheel, said control signal indicating a first gradient with respect to a steering angle of said steering wheel for movement of said steering wheel away from a straight-ahead position and a second gradient with respect to said steering angle for movement of said steering wheel towards said straight-ahead position, said first and second gradients being different from each other.

3. The vehicle cornering headlamp system of claim 2, wherein said means for producing said control signal comprises: means for producing first and second pulse signals in response to movement of said steering wheel towards and away from said straight-ahead position, respectively; means for frequencydividing said first and second pulse signals to produce respective third and fourth pulse signals; bidirectional counter means having a first input for causing said counter means to count in a first direction and a second input for causing said counter means to count in a second direction; means for producing a direction signal indicative of whether said steering wheel is being moved towards or away from said straight-ahead position; and gating means for selectively applying one of said first and second signals to a respective one of said first and second inputs of said counter means when said direction signal indicates said steering wheel is being moved towards said straight-ahead position and one of said third and fourth signals to a respective one of said first and second inputs of said counter means when said direction signal indicates said steering wheel is being moved away from said straight-ahead position.

4. The vehicle cornering headlamp system of claim 3 wherein said means for producing said direction signal comprises decoder means having an input coupled to a count output of said counter means.

5. A vehicle cornering headlamp system comprising:

a headlamp having a rotatable sub-reflector for setting a direction of illumination of said headlamp;

servo motor means for setting a rotational position of said sub-reflector, said servo motor means having first and second inputs for effecting rotation of said sub-reflector in respective first and second rotational directions;

means for producing a feedback signal indicative of a present rotational position of said sub-reflector;

control signal generator means for producing a control signal having a pulse width dependent on a steering angle and varying with movement of a steering wheel at a faster rate for movement of said steering wheel towards a straight-ahead position than for movement of said steering wheel away from said straightahead position;

position shift detecting means operating in response to said control signal and said feedback signal for producing first and second position-shift signals having pulse widths indicative of amounts of deviation of said sub-reflector from a desired position indicated by said control signal for clockwise and counterclockwise movement, respectively, of said steering wheel;

motor drive time calculating means for producing in response to said first and second position-shift signals a motor driving signal having a duration determined by one of said first and second position-shift signals; and direction of rotation discriminating means operating in response to said first and second position-shift signals for applying said motor drive signal to a one of said first and second inputs of said servo motor means selected in accordance with a direction of rotation of said steering wheel.

6. The vehicle cornering system of claim 5, wherein said means for producing said feedback signal comprises a potentiometer coupled to an output shaft of said servo motor means.

7. The vehicle cornering system of claim 5, wherein said control signal generator means comprises: means for producing first and second pulse signals in response to movement of said steering wheel towards and away from said straight-ahead position, respectively; means for frequency-dividing said first and second pulse signals to produce respective third and fourth pulse signals; bidirectional counter means having a first input for causing said counter means to count in a first direction and a second input for causing said counter means to count in a second direction; means for producing a direction signal indicative of whether said steering wheel is being moved towards or away from said straight-ahead position; gating means for selectively applying one of said first and second signals to a respective one of said first and second inputs of said counter means when said direction signal indicates said steering wheel is being moved towards said straight-ahead position and one of said third and fourth signals to a respective one of said first and second inputs of said counter means when said direction signal indicates said steering wheel is being moved away from said straight-ahead position; a digital-to-analog converter having an input coupled to a count output of said counter means; a sawtooth wave generator; and a comparator receiving as inputs an output of said digital-to-analog converter and an output of said sawtooth wave generator.

8. The vehicle cornering headlamp system of claim 5, wherein said position shift detecting means comprises: a first latch circuit receiving said control signal on a first input thereof; a comparator having a first input receiving said feedback signal and an output coupled to a second input of said latch circuit; a switching transistor having an input coupled to an output of said first latch circuit; an RC time constant circuit coupled to an output element of said switching transistor and a second input of said comparator; and gate circuit having a first input receiving said control signal and a second input coupled to an output of said first latch circuit.

9. The vehicle cornering headlamp system of claim 8, wherein said direction of rotation discriminating means comprises a second latch circuit having inputs coupled to respective outputs of said gate circuit.

10. The vehicle cornering headlamp system of claim 5, wherein said motor drive time calculating means comprises an OR gate receiving an inputs said first and second position-shift signals; a switching transistor having an input control element coupled to an output of said OR gate; a reference voltage source; a comparator having a first input coupled to said reference voltage source; and an RC time constant circuit coupled to an output element of said switching transistor and a second input of said comparator.

11. The vehicle cornering headlamp system of claim 1, wherein said characteristic varying means makes the gradient of the variation characteristic of said direction of illumination with respect to the steering angle about twice as large in the case where the steering wheel is turned towards the straight-ahead steering position than in the case where the steering wheel is turned away from the straight-ahead steering position.

12. The vehicle cornering headlamp system of claim 2, wherein said second gradient is larger than the first gradient.

13. The vehicle cornering headlamp system of claim 12, wherein the second gradient is about twice as large as the first gradient.

* * * * *